Oct. 12, 1926. 1,602,500
M. NUSS
CONTINUOUS ABSORPTION APPARATUS
Filed Oct. 10, 1922 3 Sheets-Sheet 1

Inventor:
Max Nuss,
by Byrnes, Townsend & Brickenstein
Attys.

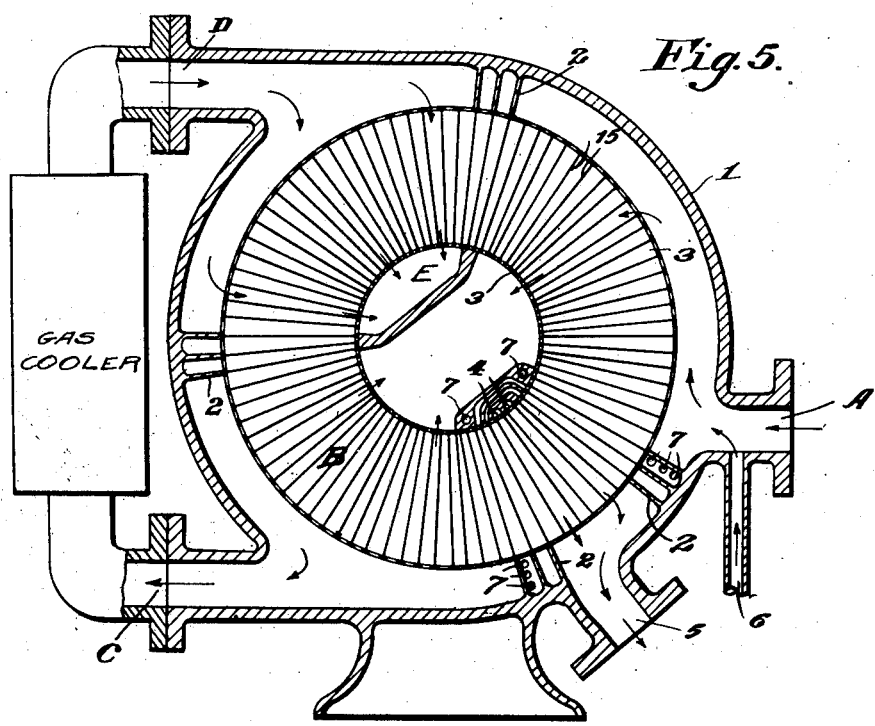
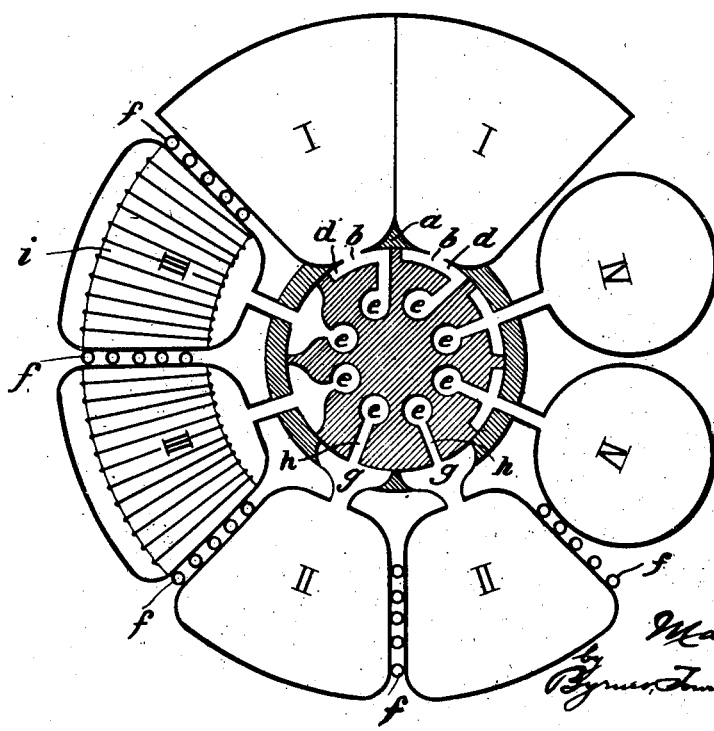

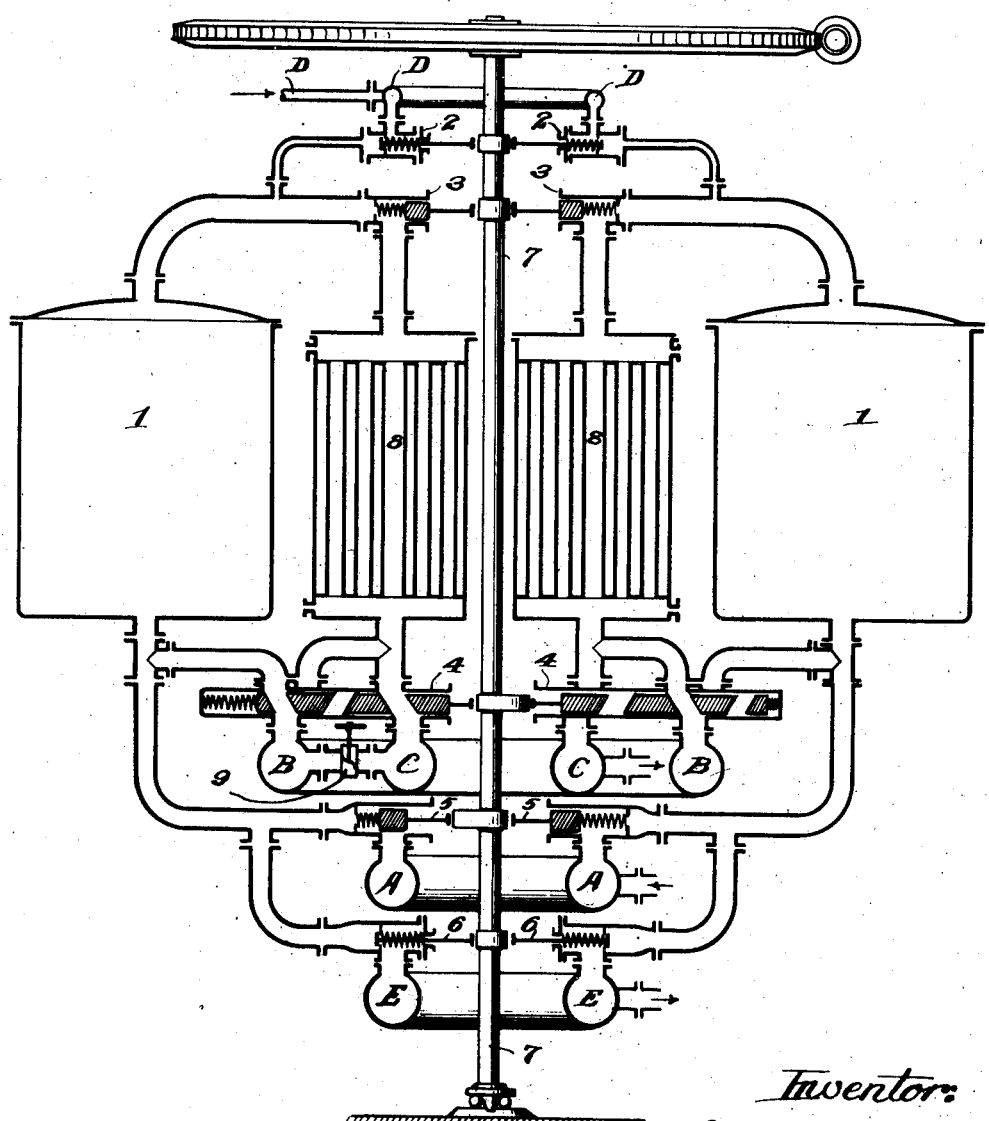

Patented Oct. 12, 1926.

1,602,500

UNITED STATES PATENT OFFICE.

MAX NUSS, OF HOCHST-ON-THE-MAIN, GERMANY, ASSIGNOR TO I. G. FARBENINDUSTRIE AKTIENGESELLSCHAFT, OF FRANKFORT-ON-THE-MAIN, GERMANY.

CONTINUOUS-ABSORPTION APPARATUS.

Application filed October 10, 1922, Serial No. 593,572, and in Germany October 10, 1921.

It is known that gases and vapors can be absorbed by means of charcoal and especially by means of charcoal which has undergone a previous chemical treatment and has thereby acquired a special reacting ability. It is further known that by various methods, such as by the action of heat, water and other vapors, solvents, or the consecutive or simultaneous use of these means, the absorbed gases and vapors can be separated from the charcoal and the charcoal again made suitable for use for the absorption. The charcoal which, for the purification, has been subjected to a heat treatment must then, before re-use, be cooled in order to completely restore its absorption capacity.

Heretofore the above-described procedures and other procedures which may be required have been carried out in the same vessel, whereby the periodical exchange of vessels has been necessary.

It has been found that the absorption of gases by means of charcoal and its recovery from the absorbed materials and other procedures required for the regeneration of the charcoal and the complete restoration of its reactivity, can be accomplished in a continuous manner. This is done by placing the charcoal in an apparatus in such a way that it lies between massive, imperforate partitions which extend in the general direction of the gas and vapor streams. The supply pipes for the several gases, liquids and vapors are so grouped that by turning the absorption apparatus or by turning the system of supply pipes the latter come consecutively into communication with the several chambers situated between the massive partitions. The passage of the gases, vapors and liquids can take place in the desired direction, either axially or radially. Also the return of gases, etc., which have already passed once through the absorption system to another part of the system, for instance, the return of purified or preliminarily purified gases for cooling purposes or further purification can be accomplished in such a way that on the side of the absorption body opposite to the side on which the gases, liquids, etc., first enter the required direction is given to the gases, liquids, etc., by means of conduits. In a similar manner the introduction of the gases, liquids and vapors can, if desired, initially take place from opposite ends of the absorption vessel.

Further modifications in the construction of the apparatus for the continuous absorption of gases and vapors can be obtained by giving the partitions such a shape and arranging the chambers formed by the subdivisions at such a distance from one another as to form a system of single vessels arranged in a ring. This system of single vessels is also brought into communication with the supply pipes by its own rotation or by rotation of the latter or of both, so that thus a continuous working is rendered possible. In this case as in the case of the apparatus with a single absorption vessel but subdivided in itself it is of no consequence whether the connection of the charcoal carrier with the supply pipes is effected throughout the height of the apparatus or, for instance, only at the upper or lower end of the charcoal carrier. The supply pipes may also be placed as in the apparatus with one absorption-vessel on different sides of the charcoal carrier and the gases, vapors and liquids having already passed the carrier may be re-conducted into it from the opposite side or from the same side, after having for instance in both cases passed through a cooler or the like.

It is of no consequence in the apparatus, whether consisting of one or several absorption-vessels, how the charcoal is disposed within the sectors or the single vessels. There may also be made some further special arrangements in these sectors or chambers for regulating the passage or the distribution of the gases, vapors and the liquids in a special manner. Thus for instance these chambers may be subdivided by partitions and other provisions may be made for regulating the resistance within the chambers in a special manner so that the best possible uniformity in the distribution of the gases, vapors and liquids is secured.

The relative movement between the charcoal chambers and the supply pipes may be accomplished by intermittent movement of the parts. However, also continuous movement may be employed, the desired period of communication between the chambers and the supply pipes may be obtained by enlarging either the chamber inlets or the communicating ends of the supply pipes.

Instead of effecting the connection between the supply pipes and the charcoal-carriers by rotating either or both together, the charcoal-carriers and supply pipes may be connected in fixed position and the alternate entrance of the various gases, vapors and liquids accomplished by arrangements which secure periodically the alternate entrance of the gases, vapors and liquids by valves being shut or opened. Also in this case it makes no difference at what point the pipes enter the charcoal-carrier-chambers and at what point the valves are actuated; this may even be done outside the charcoal-carrier system.

Several forms of apparatus embodying the invention are illustrated in the accompanying drawings in which—

Fig. 5 is a vertical section of a complete unit of apparatus in which the charcoal carrier revolves in the stationary housing which carries the gas, etc., supply conduits, the gases passing radially through the charcoal chambers;

Fig. 6 is a sectional view illustrating several forms of charcoal chambers and several types of connections between the charcoal chambers and the gas supply conduits. In the apparatus illustrated the gas supply conduits are adapted to be rotated;

Fig. 7 is a vertical section, parts being shown in elevation of a complete unit of apparatus in which the communications between the charcoal chambers and the gas supply conduits are controlled by valves.

Figure 1:
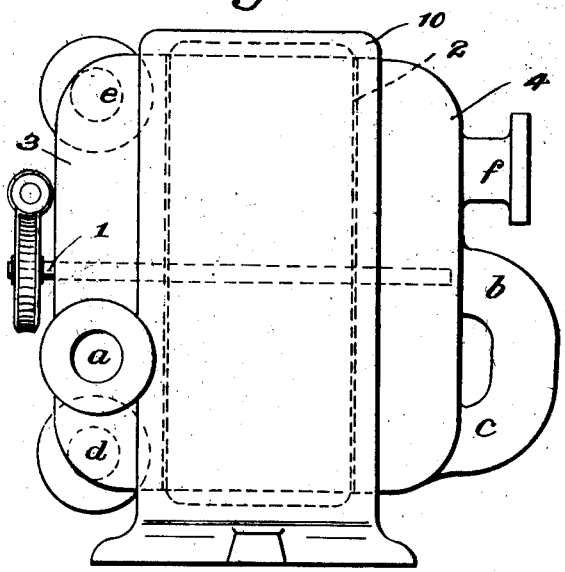
Fig. 1 is a vertical elevation of a complete unit of apparatus in which the supply conduits remain stationary while the charcoal chambers are revolved and the gases etc., pass axially through the chambers.
Figure 2:
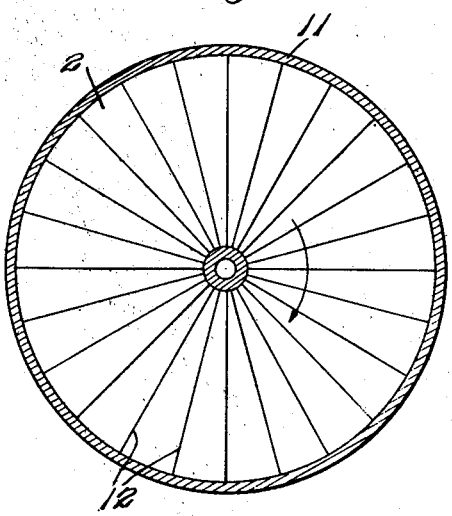
Fig. 2 is a vertical section through the charcoal carrier 2 of Fig. 1.
Figure 3:
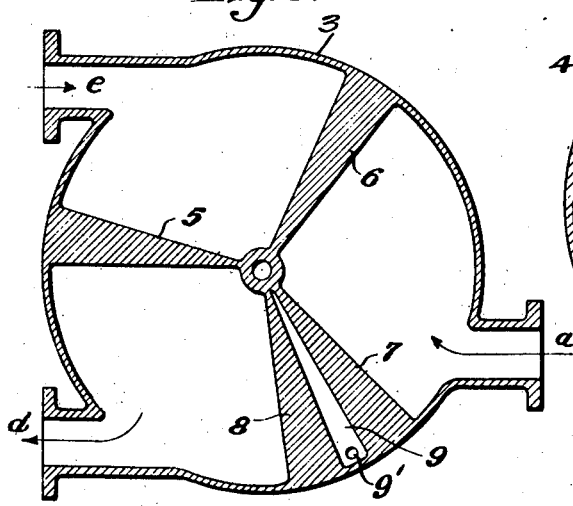
Fig. 3 is a vertical section through the stationary cap on the left hand side of Fig. 1.
Figure 4:
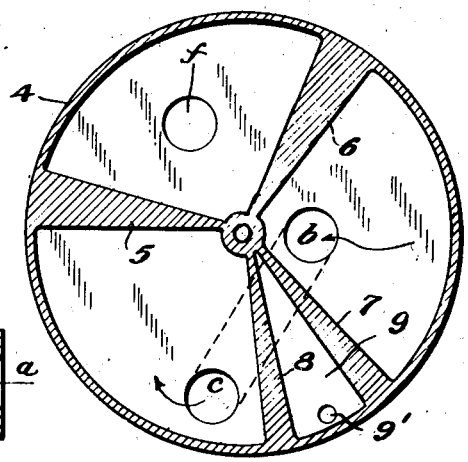
Fig. 4 is a vertical section through the stationary cap on the right hand side of Fig. 1.

Referring to Figs. 1 to 4, the charcoal chambers are in the form of a drum 2 having an imperforate cylindrical outer wall 11 and radial partitions 12. The drum 2 is mounted upon the rotatable shaft 1 driven by suitable gears. The drum 2 is surrounded by the jacket 10, the ends of which are closed by the caps 3 and 4 (see Figs. 3 and 4). Cap 3 is divided into spaces by the partition walls 5, 6, 7 and 8 and is provided with a gas inlet opening $a$, a gas discharge opening $d$, and a gas return opening $e$. The space 9 between walls 7 and 8 communicates with a suitable steam supply through pipe 9'. The end cap 4 (see Fig. 4) is divided into spaces corresponding with those in the cap 3 by corresponding partitions 5, 6, 7 and 8 and has a gas outlet $f$ and a by-pass pipe connecting the gas outlet $b$ and the gas return opening $c$. In operation raw gas to be treated, carrying for instance benzene, enters the apparatus through $a$ and passes axially through the charcoal chambers, the benzene being absorbed, and then through the opening $b$, and the by-pass pipe to the gas return opening $c$, thence through the charcoal chambers axially, cooling the same, and out through the opening $d$, then through cooling apparatus not shown, and then by way of the opening $e$ through another section of the charcoal chambers, leaving the apparatus by way of $f$. Steam is supplied to space 9, Fig. 3, and passes through the communicating charcoal chambers, the resulting mixture of steam and evaporated benzene passing by way of the space 9, Fig. 4, to condensing apparatus. The drum 2 revolves clockwise, and thus the charcoal first receives a charge of absorbed gas, etc., the charcoal then moving between spaces 9 where the absorbed gas is steamed out. The hot charcoal then passes between partitions 5 and 8 and then between the partitions 5 and 6 where it is cooled first by the passage of stripped gases and then by refrigerated gases as indicated above.

The operation of the apparatus illustrated in Fig. 5 is similar to the operation of the apparatus illustrated in Figs. 1 to 4, excepting that the gases pass radially through the charcoal chambers. The charcoal chambers are formed in a rotatable hollow drum having perforated cylindrical outer and inner walls 3, 3 and imperforate radial partitions 15. The casing 1 surrounds the drum and is provided with inwardly projecting partitions 2 dividing the casing into four spaces communicating with the four gas conduits A, C, D and 5. Raw gas enters the apparatus at A and passes radially through the charcoal chambers to the central open space, then radially outwardly through the section of chambers marked B and through the conduit C to cooling apparatus, and is then returned to the apparatus through conduit D and passes radially through the communicating charcoal chambers and discharges through the axial conduit E. The absorbed material is steamed out when the charcoal chambers communicate with conduit 5, steam being supplied through openings 4, 4. The openings 4 are inclosed in a jacket which is cooled by a refrigerating fluid passed through the conduits 7, 7, the partitions or dams on each side of the conduit 5 being similarly cooled to prevent the transmission of heat to the charcoal chambers in the absorbing and cooling zones.

In Fig. 6, I represents two charcoal chambers separated by the dividing wall $a$ and communicating with the gas supply conduits e through narrow slits b. The elongated openings d which connect conduits e permit the passage of gas for the desired period while the group of conduits is rotating. The charcoal chambers II are similar to those illustrated at I but cooling pipes f are situated between the individual chambers and the communication between the conduits e and the chambers is accomplished through the narrow tubes h and the enlarged stationary openings g. The charcoal chambers III are provided with baffles or plates i to ensure the uniform passage of the gas through the body of charcoal. The communication between chambers III and the supply conduits e is the reverse of that illustrated in connection with chambers II. Charcoal chambers IV are separate from each other instead of being in the form of a unitary structure divided into chambers by partitions. The communication between the chambers is similar to that illustrated in connection with charcoal chambers III.

In Fig. 7, 1 are the charcoal chambers and 8 are refrigerating units. In operation the raw gas enters the manifold A, the valves being in the position shown, and passes through the right hand valve 5, thence upwardly through the right hand charcoal chamber 1, thence by way of valve 3 through the right hand refrigerator 8, thence by way of valve 4 to manifold B, thence through the left hand charcoal chamber 1 and by way of the left hand valve 3 through the left hand refrigerator 8 to the outlet pipe c. During the above-described operation valves 2 and 6 are closed, the left hand valve 5 is closed and the valves 4, 4 are in the position shown, that is, the right hand refrigerator 8 is connected with manifold B, the left hand refrigerator is connected with outlet pipe C, and the left hand charcoal chamber 1 is connected with manifold B. The throttle valve 9 is set to maintain a higher pressure in B than in C. When the charcoal in the right hand charcoal chamber 1 has been charged with absorbed substance the valves are operated by the rotating cam shaft 7, opening the right hand valve 2, closing the right hand valves 3, 4 and 5 and opening the right hand valve 6 whereby steam is permitted to pass through the charcoal chamber 1 and then through the pipe E to condensing apparatus, not shown. By the continuous rotation of the cam shaft 7 the passage of raw gas through the charcoal in each chamber in the circular group takes place successively followed by the steaming out of the absorbed substance and the cooling of the steamed out charcoal.

The arrangement of vessels illustrated in Fig. 7 may be adapted to any space and the connecting pipes extended as is necessary to bring the valves into the desired position for operation by a single rotating cam shaft.

The apparatus described makes possible a continuous operation and has the further advantage of simple operation and the economical use of the charcoal and the steam heat or solvents.

While in this specification charcoal has been referred to as the absorbing agent, it is obvious that the same process is applicable to the use of other forms of activated carbon or other absorbents or adsorbents.

Having now described my invention, what I claim is:—

1. Continuous absorption apparatus comprising a chamber for absorptive material, means for passing fluids for charging, discharging and regenerating the absorptive material through said chamber, and baffles in said chamber extending longitudinally of the path of said fluids in said chamber.

2. Continuous absorption apparatus as defined in claim 1 comprising a plurality of chambers.

3. Continuous absorption apparatus as defined in claim 1 comprising a plurality of chambers adapted to revolve.

4. Continuous absorption apparatus comprising a series of chambers of absorptive material adapted to revolve and conduits connecting the exit of a particular chamber in which absorption has taken place with the inlet of a successive chamber of the series.

5. Continuous absorption apparatus comprising a plurality of chambers adapted to contain absorptive material, said chambers adapted to revolve, and means for introducing fluids for charging, discharging and regenerating the absorptive material into said chambers, said means comprising conduits adapted to communicate with ports in said chambers, the area of the communicating connection between each of said conduits and each of said ports being greater than the cross-sectional area of the corresponding conduits.

6. Apparatus for continuous absorption and recovery of fluids from gases carrying the same comprising a series of receptacles for absorbent material having openings to permit passage of gas therethrough, entrance and exit gas conduits arranged to be connected to said openings, conduits for passing regenerative fluid through said receptacles, additional entrance and exit gas conduits arranged to be connected to the openings in the receptacles and means for successively bringing said receptacles and conduits into operative connection by relative movement of said receptacles and conduits.

7. Apparatus for continuous absorption and recovery of fluids from gases carrying the same comprising a series of receptacles for absorbent material having openings to permit passage of gas therethrough, entrance and exit gas conduits arranged to be connected to said openings, conduits for passing a regenerative fluid through said receptacles, additional entrance and exit gas conduits arranged to be connected to said openings in the receptacles, a gas cooler interposed between an exit conduit and an additional entrance conduit, and means for successively bringing said receptacles and conduits into operative connection by relative movement of said receptacles and conduits.

8. A continuous absorption apparatus comprising a number of chambers for absorptive material, conduits for passing therethrough (1) vapors to be purified, (2) expelling fluids, and (3) the stripped gas, and means for automatically and successively connecting said conduits and chambers.

In testimony whereof, I affix my signature.

MAX NUSS.